Patented Mar. 4, 1947

2,416,966

UNITED STATES PATENT OFFICE 2,416,966

ISOMERIZATION OF DECALIN

Charles L. Thomas and Herman S. Bloch, Riverside, Ill., assignors to Universal Oil Products Company, Chicago, Ill., a corporation of Delaware No Drawing. Application April 5, 1944, Serial No. 529,683

5 Claims. (Cl. 260—666)

1

This invention relates to the isomerization of decalin and is more particularly directed to the isomerization of decalin in the presence of specific catalysts and under selected conditions of temperature and pressure.

The hydrocarbon decahydronaphthalene or as more commonly termed "decalin" ordinarily exists in the form of cis-decalin and trans-decalin. These materials are ordinarily obtained from hydrocarbon oils or by the hydrogenation of naphthalene produced in coal tar distillation operations. The principal use of decalin at the present time is as a solvent in varnishes and lacquers. Its physical properties such as its high solvent power and great stability to oxygen make it particularly useful in these types of materials. In fact, because of its great stability to oxygen, it has been found to be advantageous to incorporate a small amount of decalin with turpentine when the latter is used as a solvent to counteract the tendency of the turpentine towards resinification.

Isodecalins formed by the isomerization of either cis or trans decalins have additional physical properties which increase their value as solvents in varnishes and lacquers. The isodecalins because of their increased volatility form quicker drying materials than the materials having the cis or trans decalins incorporated therein. The "dry time" relationship of the isodecalins is considerably less, in some instances, only slightly more than half, than that of the cis and trans decaline. This dry time relationship is defined as the length of time it takes to evaporate a quantity of isodecaline in comparison with the length of time necessary to evaporate a similar quantity of ethyl ether.

Extensive use of the isodecalins as solvents has been prohibited due principally to the limited supply available and the lack of a simple and efficient method for producing these compounds from more abundant materials. It is an object of this invention to provide a commercially feasible method for converting decahydronaphthalene into "isodecalins" which can be satisfactorily employed as solvents in varnishes and lacquers.

The term "isodecalins" as used hereinafter in this specification and appended claims is intended to mean a hydrocarbon fraction resulting from the conversion of decahydronaphthalene in the presence of selected catalysts hereinafter disclosed and under selected conditions of operation, said fraction being substantially free of aromatics and olefins, having a boiling range of 155 to 185°

2

C. and an index of refraction greater than 1.46, and predominantly composed of bicyclonaphthenes having 10 carbon atoms to the molecule.

A feature of the present invention is the use of catalytic materials which are suitable for directing and accelerating the desired reaction. These catalysts will include associations of the refractory oxides or fluorides of aluminum, zirconium, magnesium, thorium and boron. Included within the broad scope of this invention are such catalysts as alumino-silicate clays having molal ratios of silica to alumina of 3:1 or higher either as such or after being activated by acid treatment, aluminum fluoride hemihydrate, magnesium fluoride, alumina-boria and composites of silica and at least one of the following oxides: alumina, zirconia, magnesia, thoria and boria.

In one broad embodiment the present invention comprises a process for the conversion of decahydronaphthalene into isodecalins by subjecting said decahydronaphthalene under conversion conditions to the action of a composite catalyst comprising at least two compounds selected from the group consisting of the refractory oxides and fluorides of aluminum, zirconium, magnesium, thorium and boron.

The synthetic catalysts, in particular those comprising associations of silica with at least one other refractory oxide, may be prepared by separately forming the hydrogels and compositing these hydrogels in the desired proportion, or may be formed by preparing a single hydrogel, for example, silica hydrogel, and incorporating the refractory oxides thereon by contacting said hydrogel with a solution of a soluble salt followed by precipitation of the hydrated oxide and drying and calcining the mass to form an association of the refractory oxides. Alternatively, a purified silica hydrogel may be formed and contacted with a decomposable salt, for example, aluminum or zirconium nitrates followed by heating to incorporate alumina and/or zirconia thereon.

The catalyst may be also prepared by simultaneously precipitating the hydrogels of two or more of the refractory oxides followed by drying and calcining to form the desired catalyst composite.

A particularly suitable catalyst comprises an association of silica and alumina prepared in the following manner: a silica hydrogel is formed by mixing a solution of a soluble silicate such as water glass with an acid, purifying the resulting silica hydrogel by washing with acidified water or solutions of ammonium salts or multivalent salts to effect a displacement of the alkali metal ion, contacting said purified hydrogel with a solution of a soluble aluminum salt, precipitating the alumina on the silica hydrogel by the addition of a basic precipitant such as ammonium hydroxide or ammonium carbonate, and heating and drying the resulting composite. A silica-alumina catalyst may be prepared by a similar method with the exception that the purification is effected after the alumina has been precipitated on the silica hydrogel. In this latter method of preparation, there is no necessity to limit the precipitant to a volatile basic precipitant since any alkali metal ions which may be incorporated into the composite by the use of a basic precipitant, such as sodium hydroxide, sodium carbonate, potassium hydroxide or potassium carbonate, will be removed in a subsequent purification treatment. The purified composite may then be dried and calcined at temperatures within the approximate range of about 300 to about 600° C.

It is not intended that the catalytic materials recited above be considered equivalent in their ability to accelerate the desired reaction in the process of the present invention. The activity of these catalytic materials will be somewhat dependent upon the composition and also upon the method of preparation employed.

The operating conditions such as temperatures, pressures and space velocities which may be satisfactorily employed fall within the following general broad ranges. The particular temperature and pressure selected for any operation will be dependent to a certain extent upon the catalyst being employed and the extent of conversion desired. Temperatures of the order of about 300° C. to about 600° C., pressures below about 100 pounds per square inch, and space velocities in excess of 0.25 measured as volumes of liquid charge per volume of catalyst per hour have been found to give satisfactory results.

In accordance with the present invention, the catalyst may be conveniently utilized as filling material in tubes or chambers in the form of small pellets or granules in fixed bed relationship to the incoming reactants or in the finely divided state in a "fluidized" or "compact bed" type of operation.

In the "fluidized" operation, the charge is passed upwardly through a body of finely divided catalysts causing the catalyst particles to be motionalized and forming a fluid-like mass. The catalyst is continuously withdrawn from the reaction zone, regenerated and returned thereto.

In the "moving bed" type of operation, the compact bed may be continuously passed through the reaction zone concurrently or countercurrently to the incoming reactants and passed therefrom into a regeneration zone from which it is returned to the reaction zone after having been regenerated by the combustion of the carbonaceous materials deposited thereon during the conversion reaction.

Another alternative mode of operation comprises suspending the catalyst in a stream of charge and treating said suspension under suitable conditions of temperature and pressure to produce the desired conversion reaction.

After passage of the charge through the catalyst, the products may be separated into the desired fractions of isodecalins, lower boiling hydrocarbons and unconverted decalins, the latter material being recycled to the reaction zone.

The catalysts employed in the process of the present invention possess a large total contact surface corresponding to the desirable porosity, the pores of the catalyst particles being of such size and shape that they do not become clogged with carbonaceous deposits after a long period of service and therefore are not difficult to reactivate by oxidation. This structure is also retained after many alternate periods of use and reactivation as evidenced by the fact that the catalyst may be repeatedly reactived by passing air or other oxidizing gas over the spent particles to burn over deposits of carbonaceous materials at temperatures above 800° F., without apparently affecting the catalyst activity.

The following examples are given to indicate the novelty and utility of the present invention but it is not intended that the invention be limited to exact agreement with the date hereinafter introduced.

The charging stock employed in the following examples was a commercial decalin which was redistilled on a 50 bubble cap column of the Bruun type. The fractions used had a boiling range of 185 to 193.4° C. and an index of refraction of 1.4768. This charging stock was introduced into a reaction vessel containing a bed of synthetically prepared silica-alumina-zirconia catalyst disposed within said reaction zone in fixed bed relationship to the incoming reactants.

The operating conditions and results obtained in the three tests are shown below:

| Ex. No | 1 | 2 | 3 |
| --- | --- | --- | --- |
| Temp., ° C | 400 | 500 | 500 |
| Liquid hourly space velocity | 0.95 | 3.8 | 4.0 |
| Duration of period, hrs | 1.0 | 0.5 | 1 |
| Products, wt. per cent of charge: | | | |
| Gas | 9.1 | 13.8 | 8.9 |
| Liquid | 88.5 | 86.0 | 91.4 |
| Cat. deposit and loss | 2.4 | 0.2 | 0.1 |

*Composition of the liquid products of the decalin conversion*

| Ex. No | 1 | 2 | 3 |
| --- | --- | --- | --- |
| Products, wt. per cent of charge: | | | |
| Olefins | 1.6 | 4.8 | 7.3 |
| Paraffins | 4.0 | 7.1 | 6.8 |
| Mono cycloparaffins | 16.8 | 10.2 | |
| "Isodecalins" | 28 | 8.7 | 11.5 |
| Unchanged decalin | 21.7 | 34.0 | 56.9 |
| Aromatics | 16.5 | 21.6 | 9.1 |
| Gas | 9.1 | 13.8 | 8.9 |
| Loss | 2.3 | −0.2 | −0.5 |

We claim as our invention:

1. A process for producing isodecalins which comprises subjecting decahydronaphthalene at a temperature of from about 300° C. to about 600° C., a pressure below about 100 pounds per square inch, and a liquid hourly space velocity in excess of 0.25 to the action of a catalyst comprising an alumino-silicate clay having a molal ratio of silica to alumina of at least 3:1 to convert a substantial portion of said decahydronaphthalene to a substantially olefin-free and aromatic-free hydrocarbon fraction having a boiling range of 155 to 185° C. and an index of refraction greater than 1.46.

2. A process for producing isodecalins which comprises subjecting decahydronaphthalene at a temperature of from about 300° C. to about 600° C., a pressure below about 100 pounds per square inch, and a liquid hourly space velocity in excess of 0.25 to the action of a catalyst comprising silica and alumina to convert a substantial portion of said decahydronaphthalene to a substantially olefin-free and aromatic-free hydrocarbon fraction having a boiling range of 155 to 185° C. and in index of refraction greater than 1.46.

3. A process for producing isodecalins which comprises subjecting decahydronaphthalene at a temperature of from about 300° C. to about 600° C., a pressure below about 100 pounds per square inch, and a liquid hourly space velocity in excess of 0.25 to the action of a catalyst comprising silica, alumina and zirconia to convert a substantial portion of said decahydronaphthalene to a substantially olefin-free and aromatic-free hydrocarbon fraction having a boiling range of 155 to 185° C. and an index of refraction greater than 1.46.

4. A process for producing isodecalins which comprises subjecting decahydronaphthalene at a temperature of from about 300° C. to about 600° C., a pressure below about 100 pounds per square inch, and a liquid hourly space velocity in excess of 0.25 to the action of a catalyst comprising alumina and boria to convert a substantial portion of said decahydronaphthalene to a substantially olefin-free and aromatic-free hydrocarbon fraction having a boiling range of 155 to 185° C. and an index of refraction greater than 1.46.

5. An isomerization process for the production of isodecalins which comprises contacting decahydronaphthalene with a catalyst comprising an association of at least two compounds selected from the group consisting of silica, alumina, zirconia, magnesia, thoria, and boria at a temperature of from about 300° C. to about 600° C., a pressure below about 100 pounds per square inch, and a liquid hourly space velocity in excess of 0.25 to convert a substantial portion of said decahydronaphthalene to a substantially olefin-free and aromatic-free hydrocarbon fraction having a boiling range of 155° C. to 185° C. and an index of refraction greater than 1.46.

CHARLES L. THOMAS.
HERMAN S. BLOCH.

REFERENCES CITED

The following references are of record in the file of this patent:

UNITED STATES PATENTS

| Number | Name | Date |
| --- | --- | --- |
| 2,285,314 | Thomas et al. | June 2, 1942 |
| 2,296,395 | Michael et al. | Sept. 22, 1942 |

FOREIGN PATENTS

| Number | Country | Date |
| --- | --- | --- |
| 406,808 | British | Mar. 8, 1934 |

OTHER REFERENCES

Sundgren, Anaales des Combustibles Liquides, vol. 5, 121–129 (1930). (Patent Office Library.)